(12) United States Patent
Oi et al.

(10) Patent No.: US 7,233,592 B1
(45) Date of Patent: Jun. 19, 2007

(54) PACKET TRANSFER CONTROL CIRCUIT

(75) Inventors: Kenji Oi, Kasugai (JP); Takashi Shimizu, Kasugai (JP); Hirotaka Ueno, Kasugai (JP); Hiroshi Takase, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/505,775

(22) Filed: Feb. 17, 2000

(30) Foreign Application Priority Data

Jun. 8, 1999 (JP) ............................ 11-161037

(51) Int. Cl.
H04L 12/56 (2006.01)
G06F 15/16 (2006.01)

(52) U.S. Cl. .................. 370/392; 370/400; 709/236

(58) Field of Classification Search ............ 370/392, 370/400, 474, 389, 406–408; 709/236, 248, 709/253; 710/20, 100
See application file for complete search history.

(56) References Cited

U.S. PATENT DOCUMENTS

| 4,665,514 | A | * | 5/1987 | Ching et al. ............... 370/392 |
| 5,111,456 | A | * | 5/1992 | Limb ......................... 370/440 |
| 5,398,242 | A | * | 3/1995 | Perlman ..................... 370/256 |
| 5,737,320 | A | * | 4/1998 | Madonna .................... 370/258 |
| 5,864,551 | A | * | 1/1999 | Madonna .................... 370/353 |
| 5,946,708 | A | * | 8/1999 | Fang et al. ................. 711/113 |
| 5,970,068 | A | * | 10/1999 | Gray et al. ............. 370/395.5 |
| 6,018,816 | A | * | 1/2000 | Tateyama ................... 714/746 |
| 6,105,119 | A | * | 8/2000 | Kerr et al. .................. 711/219 |
| 6,512,767 | B1 | * | 1/2003 | Takeda et al. ............. 370/389 |
| 2001/0044878 | A1 | * | 11/2001 | Ando et al. ................ 711/112 |
| 2004/0125825 | A1 | * | 7/2004 | Lym et al. .................. 370/519 |

* cited by examiner

*Primary Examiner*—Seema S. Rao
*Assistant Examiner*—Gregory B. Sefcheck
(74) *Attorney, Agent, or Firm*—Staas & Halsey LLP

(57) ABSTRACT

A packet transfer control circuit is a part of a node in a network of nodes, in which packets of data are passed between the nodes. The packets include normal packets and write packets, and each packet includes a header portion and a data portion. The transfer control circuit includes an identification circuit which identifies if the data portion of a write packet is blank and a processor with a memory connected to the identification circuit. If the write packet is blank, as determined by the identification circuit and the processor is holding data for transmission to another node, the processor puts the data into the data portion of the packet, zero fills if the there is not enough data to fill the data portion, updates the header with the new addressee, and then passes the write packet on to the other nodes.

24 Claims, 8 Drawing Sheets

Fig.1 (PRIOR ART)
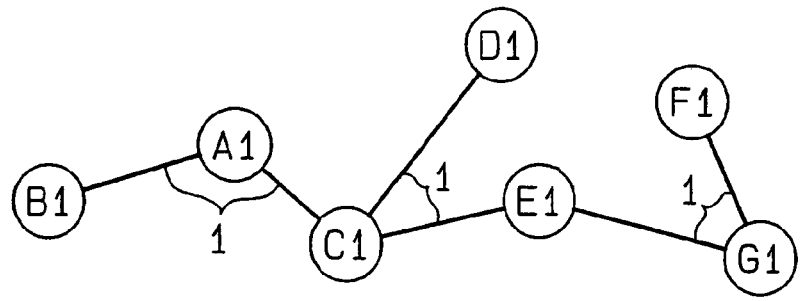
Fig.2 (PRIOR ART)
Bus Cables | ab | ef | ab | ef | ab | ef |
Fig.3 (PRIOR ART)
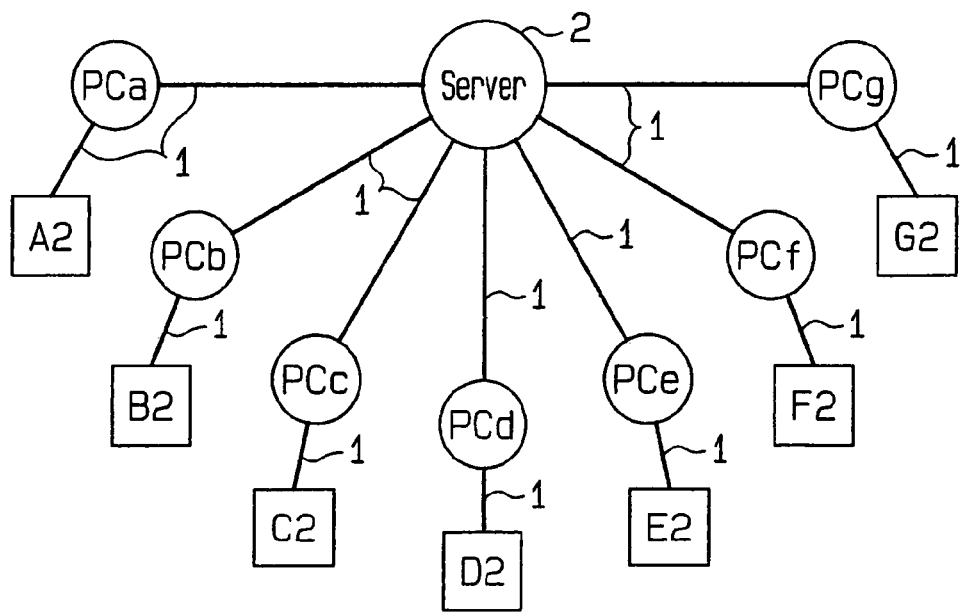

Fig.12

| | | | | | | | | | | |
|---|---|---|---|---|---|---|---|---|---|---|
| A2-PCa | a1(1) | a2(1) | b1(1) | b2(1) | c1(1) | g2(1) | ... | a1(2) | a2(2) | b3(1) | b2(2) | c3(1) |
| B2-PCb | a1(1) | a2(1) | b1(1) | b2(1) | c1(1) | g2(1) | ... | a3(1) | a2(2) | b1(2) | b2(2) | c3(1) |
| C2-PCc | a1(1) | a2(1) | b1(1) | b2(1) | c1(1) | g2(1) | ... | a3(1) | a2(2) | b3(1) | b2(2) | c1(2) |
| D2-PCd | a1(1) | a2(1) | b1(1) | b2(1) | c1(1) | g2(1) | ... | a3(1) | a2(2) | b3(1) | b2(2) | c3(1) |
| E2-PCe | a1(1) | a2(1) | b1(1) | b2(1) | c1(1) | g2(1) | ... | a3(1) | a2(2) | b3(1) | b2(2) | c3(1) |
| F2-PCf | a1(1) | a2(1) | b1(1) | b2(1) | c1(1) | g2(1) | ... | a3(1) | a2(2) | b3(1) | b2(2) | c3(1) |
| G2-PCg | a1(1) | a2(1) | b1(1) | b2(1) | c1(1) | g2(1) | ... | a3(1) | a2(2) | b3(1) | b2(2) | c3(1) |
| PC-PC | a1(1) | a2(1) | b1(1) | b2(1) | c1(1) | g2(1) | ... | a1(2) | a2(2) | b1(2) | b2(2) | c1(2) |

PACKET TRANSFER CONTROL CIRCUIT

BACKGROUND OF THE INVENTION

The present invention relates to a packet transfer method and a packet transfer control circuit. More particularly, the present invention pertains to an optimal packet transfer method for a packet transfer control circuit having a serial interface that complies with the IEEE 1394 standard.

Serial interfaces complying with the IEEE 1394 standard are used to connect digital video cameras, which store a large amount of audio and visual data, and peripheral equipment, such as color page printers, to personal computers. FIG. 1 shows a first prior art example of a network system connecting a plurality of apparatuses. A plurality of IEEE 1394 bus cables 1 connect nodes A1–G1 to one another. The nodes A1–G1 each represent, for example, a computer-related apparatus such as a personal computer, a monitor, a digital video camera, or a printer.

Referring to FIG. 1, the nodes B1, A1, C1, E1, G1, F1 are connected in series and the node D1 is connected to the node C1. The nodes A1–G1 each have a packet transfer control circuit (not shown) for performing packet transfer.

The transfer of data in a network having the topology or layout of FIG. 1 will now be described using an example of when the node A1 transfers data to the node B1 while the node E1 transfers data to the node F1.

The node A1 transfers packet "ab", which is addressed to the node B1, to the nodes B1, C1. The node B1 determines that the packet ab is addressed to it upon reading the information of a header included in the packet ab. The node B1 acquires the data stored in the packet ab. Although the node C1 also receives the packet ab, the node C1 determines that the packet ab is addressed to another node upon reading the header information and transfers the packet ab downstream to the nodes D1, E1. In the same manner, the node E1 transfers the packet ab to the further downstream node G1, which in turn, transfers the packet ab to the node F1. In this manner, the packet ab is transferred to all of the nodes including the non-addressee nodes C1, D1, E1, G1, F1 in addition to the addressee node B1.

The node E1 transfers a packet "ef", which is addressed to the node F1, to the nodes C1, G1. The node G1 determines that the packet ef is addressed to another node upon reading the information of a header included in the packet ef and transfers the packet ef to the downstream node F1. The node F1 determines that the packet ef is addressed to it upon reading the header information and acquires the data stored in the packet ef. The node C1 determines that the packet ef has been addressed to another node upon reading the header information of the packet ef and transfers the packet ef to the downstream nodes A1 and D1. In the same manner, the node A1 transfers the packet ef to the further downstream node B1. Thus, the packet ef is transferred to the non-addressee nodes A1, B1, C1, D1, G1 in addition to the addressee node F1. The bus cables 1 are entirely occupied by the two packets ab, ef which are transferred alternately as shown in FIG. 2.

As a second prior art example, a network having the topology shown in FIG. 3 will be described. The network of FIG. 3 is, for example, used in a television conference system. Nodes A2–G2 and nodes PCa–PCg are connected to one another by bus cables 1. Each of the nodes PCa–PCg is a terminal device, such as a personal computer. Each of the nodes A2–G2 is a conference-related device, such as an input device or a display device.

The nodes A2–G2 are connected to the devices PCa–PCg, respectively. The nodes PCa–PCg are each connected to a server 2. The nodes A2–G2 and PCa–PCg are laid out about the server 2. The nodes A2–G2, PCa–PCg each have a packet transfer control circuit (not shown) for performing packet transfer.

The topology of FIG. 3 will now be described using an example of when the data input to the node A2 is displayed at the nodes B2–G2. The node A2 transfers a packet A·PCa, which includes the input data, to the node PCa. The node PCa processes the data of the packet A·PCa and generates a packet PCa·PC(b–g), which includes the processed data. The node PCa transfers the packet PCa·PC(b–g) to the nodes PCb–PCg by way of the server 2. The nodes PCb–PCg each process the data of the packet PCa·PC(b–g) to respectively generate packets PCb·B, PCc·C, PCd·D, PCe·E, PCf·F, PCg·G, which include the newly processed data and are transferred to the associated nodes B2–G2.

In this case, the packet A·PCa is transferred to the nodes B2–G2 via the node PCa, the server 2, and the nodes PCb–PCg. The node PCa determines that the packet A·PCa has been addressed to it upon reading the information of a header included in the packet A·PCa and acquires the data stored in the packet A·PCa to generate the processed data. The node PCa then transfers the packet PCa·PC(b–g), which includes the data addressed to the nodes PCb–PCg, to the nodes B2–G2 via the corresponding nodes PCb–PCg and to the node A2. The nodes PCb–PCg each recognize that the packet PCa·PC(b–g) is addressed to them by reading the information of a header included in the packet PCa·PC(b–g) and acquire the data to generate the newly processed data. The node PCb transfers the packet PCb·B, which includes the data addressed to the node B2, to the nodes A2, C2–G2 via the corresponding nodes PCa, PCc–PCg in addition to the node B2. The node B2 determines that the packet PCb·B has been addressed to it upon reading the header information in the packet PCb·B and acquires the data stored in the packet PCb·B.

Subsequently, in the same manner, the nodes PCc–PCg transfer packets PCc·C, PCd·D, PCe·E, PCf·F, PCg·G addressed to the nodes C2–G2. Accordingly, eight packets are required for a single transfer cycle as shown in FIG. 4.

As described above, in the first and second prior art examples, packets that need only be transferred between certain nodes are transferred to all of the nodes. This substantially decreases data transfer speed when a large amount of data is transferred simultaneously.

SUMMARY OF THE INVENTION

It is an object of the present invention to provide a packet transfer method and a packet transfer control circuit that increase the data transfer speed.

To achieve the above object, the present invention provides a method for transferring packets between a plurality of nodes including a first node, a second node, and a third node connected to one another by a bus. The method includes the steps of (a) transferring a write packet from the first node to the second node, (b) storing data addressed to the third node in the write packet at the second node, and (c) transferring the write packet from the second node to the third node.

Another aspect of the present invention provides a method for transferring packets between a plurality of connected nodes including a first node, a second node, and a third node. The method includes the steps of transferring a first packet storing first data from the first node to the second node, processing the first data stored in the first packet and temporarily storing the processed first data at the second node, transferring a second packet storing second data from the first node to the second node, rewriting the second data stored in the second packet to the processed and temporarily stored first data at the second node, and transferring the second packet storing the processed first data to the third node.

A further aspect of the present invention provides a packet transfer control circuit incorporated in a first node to transfer a packet to a second node, connected to the first node. The packet includes a data portion for storing data. The control circuit includes an identification circuit for identifying whether the data portion is blank, and a processor connected to the identification circuit for writing data to the data portion when the data portion of the packet is blank.

A further aspect of the present invention provides a packet transfer control circuit incorporated in a first node to transfer a packet to a second node and a third node, which are connected to the first node. The packet includes a data portion for storing data. The second node is downstream from the first node and the third node is upstream from the first node. The control circuit includes a processor for retaining data addressed to the third node and rewriting the data stored in the data portion of the packet received by the first node from the second node when the stored data is addressed to the third node.

A further aspect of the present invention provides a packet transfer control circuit incorporated in a first node to transfer a plurality of packets to a second node and a third node, which are connected to the first node. Each of the packets includes a data portion for storing data. The control circuit includes a processor for transferring a write packet, the data portion of which is blank, to the second and third nodes so that the second and third nodes substantially simultaneously store data in the data portion of the write packet.

A further aspect of the present invention provides a packet transfer control circuit incorporated in a first node to transfer packets to a plurality of second nodes, which are connected to the first node. Each of the packets includes a data portion for storing data. The control circuit includes a processor for transferring to the second nodes a write packet, the data portion of which stores data, and then a further write packet, the data portion of which is blank. Each of the second nodes stores data in the blank data portion.

A further aspect of the present invention provides a packet transfer control circuit of a first network node including an input interface circuit for receiving a packet from a second network node connected to the first network node. The received packet is one of a normal packet type and a write packet type, and the received packet comprises at least a header portion and a data portion. An input link layer processing circuit is connected to the input interface circuit for receiving the received packet therefrom, reading the header portion of the packet to determine the packet type, and if the received packet is a normal packet, also determining an addressee of the packet. An identification circuit is connected to the input link layer processing circuit for receiving a write packet type of packet from the input link layer processing circuit, checking an identifier of the data portion of the write packet to determine whether the data portion of the write packet is blank and to determine an addressee of the write packet. The identification circuit generates a control signal if the data portion is blank. A processor is connected to the identification circuit and the input link layer processing circuit. The input link layer processing circuit passes the received packet directly to the processor if the received packet is addressed to the first node and is a normal type packet. The processor receives the packet data from the identification circuit if the packet is a write type packet. The processor receives the control signal from the identification circuit and pads the data portion of the packet in order to fill the data portion of the packet when the control signal indicates that the data portion is blank. A memory is connected to the processor for storing the packet data processed by the processor. An output link layer processing circuit is connected to the processor and to the input link layer processing circuit for receiving the packet therefrom and preparing a transmission packet from the packet. The input link layer processing circuit passes a normal type packet not addressed to the first node directly to the output link layer processing circuit. An output interface circuit is connected to the output link layer processing circuit for receiving the transmission packet therefrom and transmitting the transmission packet over a bus to another node.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic diagram showing a first example of a prior art network;

FIG. 2 is a timing chart illustrating the transfer process performed in the network of FIG. 1;

FIG. 3 is a schematic diagram showing a second example of a prior art network;

FIG. 12 is a timing chart showing the transfer process performed by a further example according to the present invention.

DETAILED DESCRIPTION OF THE PREFERRED EMBODIMENTS

Figure 4:
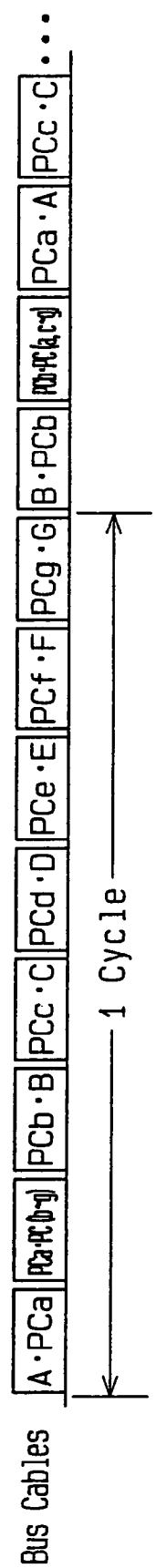
FIG. 4 is a timing chart illustrating the transfer process performed in the network of FIG. 3.
Figure 5:
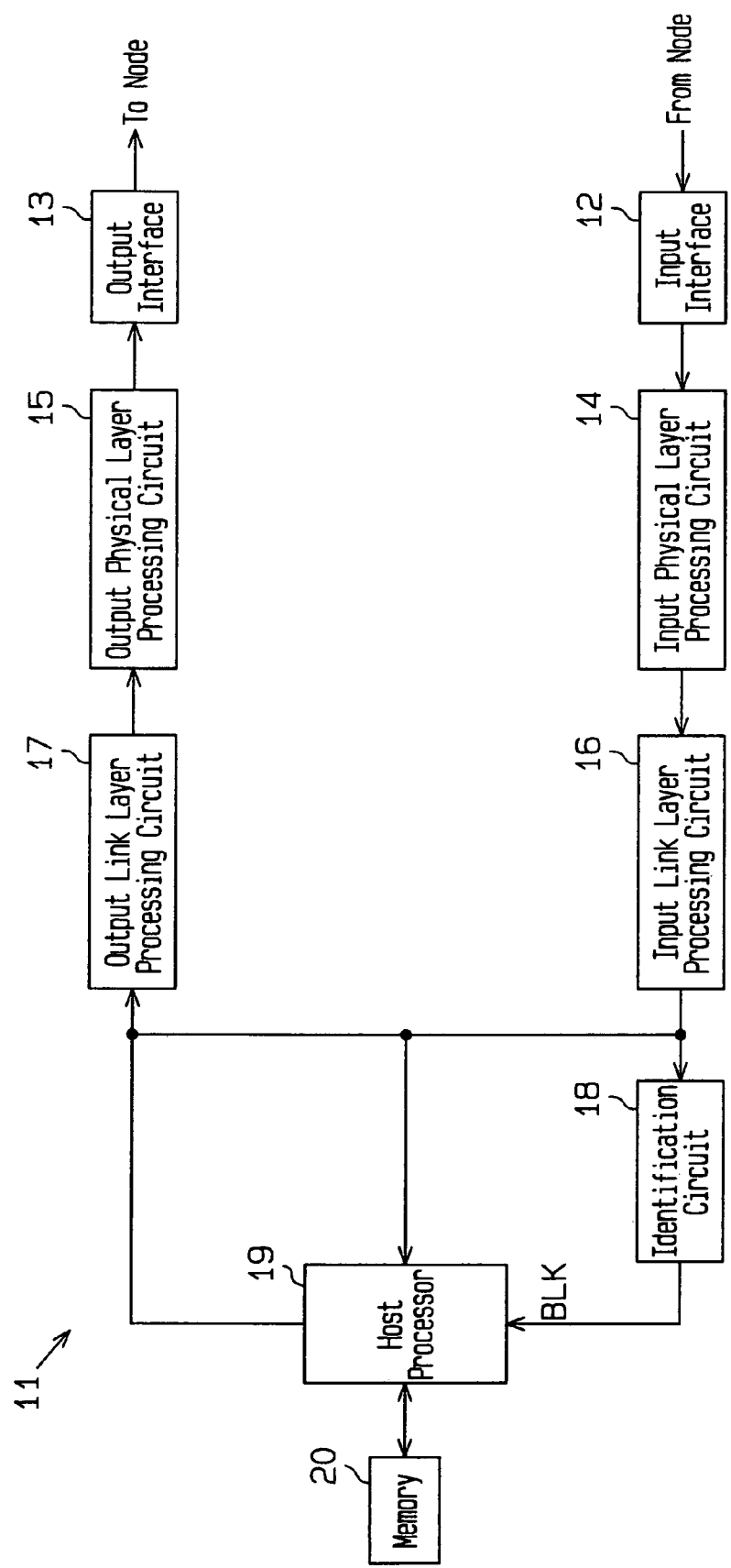
FIG. 5 is a schematic block diagram showing a packet transfer control circuit of the present invention.

A first embodiment according to the present invention will now be described with reference to FIGS. 5 to 9.

The first embodiment will be described using the same network used to describe the first prior art example (FIG. 1). According to the present invention, a packet transfer control circuit 11 is included in each of the nodes A1–G1. The packet transfer control circuit 11 includes an input interface 12, an output interface 13, an input physical layer processing circuit 14, an output physical layer processing circuit 15, input link layer processing circuit 16, an output link layer processing circuit 17, an identification circuit 18, a host processor 19, and a memory 20.

The input interface 12 is connected to the input physical layer processing circuit 14, which is further connected to the input link layer processing circuit 16. The input link layer processing circuit 16 is also connected to the identification circuit 18, the host processor 19, and the output link layer processing circuit 17. The identification circuit 18 is connected to the host processor 19. The processor 19 is connected to the output link layer processing circuit 17 and the memory 20. The output link layer processing circuit 17 is connected to the output physical layer processing circuit 15. The output physical layer processing circuit 15 is connected to the output interface 13.

The input interface 12 is a port for receiving packets, and the output interface 13 is a port for transmitting packets.

Different types of packets will now be described.

Figure 6:
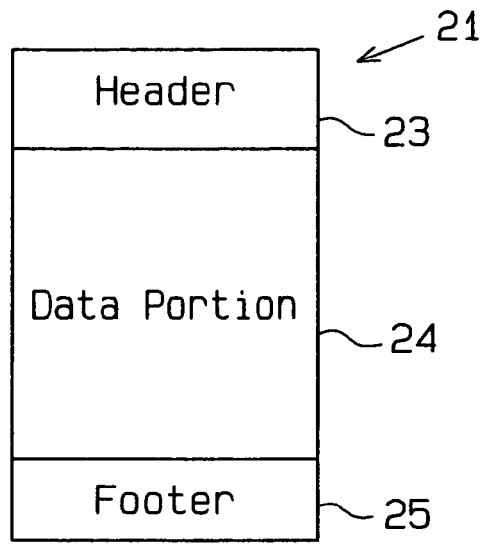
FIG. 6 is a schematic diagram illustrating a normal packet of the present invention.
Figure 7:
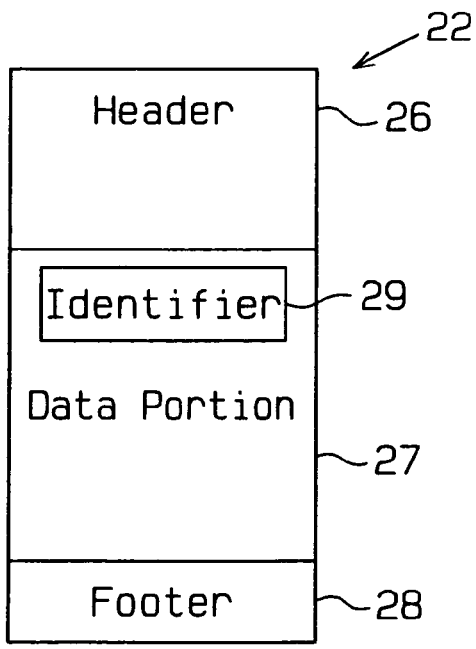
FIG. 7 is a schematic diagram illustrating a write packet of the present invention.

The packet transfer control circuit 11 processes a normal packet 21, which is shown in FIG. 6, and a write packet 22, which is shown in FIG. 7, among other types of packets. The normal packet 21 includes a packet header 23, a data portion 24, and a packet footer 25. The packet header 23 contains header information. The data portion 24 contains the data that is transferred. The packet footer 25 contains footer information.

The write packet 22 includes a packet header 26, a data portion 27, and a packet footer 28. The packet header 26 includes header information, such as an addressee node ID (physical ID), a transferrer ID (physical ID), and a transaction code indicating the packet type. In the first embodiment, a broadcast address is set as the addressee node ID. The data portion 27 has a certain storage capacity or size. Various data transferred to other nodes are contained in the data portion 27. And the data portion 27 has an identifier 29. The packet footer 28 includes footer information, such as a cyclic redundancy check (CRC) code.

Identification information is written to the identifier 29. When the data portion 27 is blank, the identification information of the identifier 29 indicates the blank state. When data is stored in the data portion 27, the identification information of the identifier 29 indicates the addressee of the data. In the first embodiment, when the identification information has a value of zero, this indicates that the data portion 27 is blank. Identification information having a value other than zero indicates the addressee of the data stored in the data portion 27.

Referring again to FIG. 5, the input physical layer processing circuit 14 receives the packets 21, 22 via the input interface 12 and provides the packets 21, 22 to the input link layer processing circuit 16. The input physical layer processing circuit 14 converts the electric signals of the packets 21, 22 to logic signals adapted to the input link layer processing circuit 16 in a manner known by those of skill in the art.

The output physical layer processing circuit 15 receives the packets 21, 22 from the output link layer processing circuit 17 and sends the packets 21, 22 to the output interface 13. The output physical layer processing circuit 15 converts the logic signals adapted to the output link layer processing circuit 17 to electric signals.

The input link layer processing circuit 16 checks the formats of the packets 21, 22 to guarantee that the packets 21, 22 have been correctly transferred.

Upon receipt of the normal packet 21, the input link layer processing circuit 16 checks the addressee of the normal packet 21 based on the header information. If the packet 21 is addressed to the node itself, the input link layer processing circuit 16 provides the data in the data portion 24 to the host processor 19. If the packet 21 is addressed only to other nodes, the input link layer processing circuit 16 bypasses the host processor 19 and sends the packet 21 to the output link layer processing circuit 17 so that the packet 21 can be transferred to the other nodes. If the packet 21 is addressed to this node and to other nodes, the input link layer processing circuit 16 passes the data portion 24 to the host processor 19, which processes the data portion 24 and then passes the processed data portion 24 to the output link layer processing circuit 17, where a new packet is built and then transmitted to other nodes via the output interface 13.

Upon receipt of the write packet 22, the input link layer processing circuit 16 provides the packet 22 to the identification circuit 18. The identification circuit 18 checks the identifier 29 of the write packet 22 to confirm that the data portion 27 of the packet 22 is not blank. If the data portion 27 is not blank, the identification circuit 18 further checks the identifier 29 for the addressee of the write packet 22.

That is, the input link layer processing circuit 16 determines if the packet is a normal packet 21 or a write packet 22. If the packet is a normal packet 21, and it is addressed to this node, then the packet 21 is passed to the host processor 19 and to the output link layer processing circuit 17 for transmission to other nodes. If the normal packet 21 is addressed only to other nodes, and not this node, it is only passed to the output link layer processing circuit 17. On the other hand, if the packet is a write packet 22, it is passed to the identification circuit 18, which determines the addressee of the packet 22. If the packet 22 is addressed to the node itself, the identification circuit 18 provides the data in the data portion 27 to the host processor 19. The identification circuit 18 also provides the write packet 22 to the output link layer processing circuit 17 to transfer the packet 22 to other nodes.

If a number of another node is written to the identifier 29 (when data is stored in the data portion 27), the write packet 22 is transferred to other nodes by the host processor 19.

When zero is written to the identifier 29 (i.e., when the data portion 27 is blank), the identification circuit 18 sends a blank packet signal BLK to the host processor 19.

As discussed above, the host processor 19 receives data from the input link layer processing circuit 16 or the identification circuit 18, processes the data, and stores the processed data in the memory 20.

If the host processor 19 receives the blank packet signal BLK when data that is to be transferred to downstream nodes is not stored in the memory 20, the host processor 19 just transmits the write packet 22 to such other nodes.

If the host processor 19 receives the blank packet signal BLK when data that is to be transferred to downstream nodes is stored in the memory 20, the host processor 19 reads the data from the memory 20 and writes the data to the data portion 27 of the write packet 22. The host processor 19 also writes the addressee (identification information) to the identifier 29 of the write packet 22. This indicates that the data portion 27 is not blank. The transfer data stored in the memory 20 undergoes padding until the data fills the data portion 27. Thus, the blank packet is efficiently used by the node if the memory 20 has data it wants to transfer to another node.

The nodes A1–G1 transfer the write packet 22. The transferrer node stores information indicating that other nodes are substantially simultaneously also transferring packets when the transferrer node starts transferring the write packet 22. For example, if the node A1 transfers a packet to the node B1, substantially simultaneously when the node E1 transfers a packet to the node F1, information indicating the transfer is stored in the node C1, which is located upstream from the two nodes A1, E1.

More specifically, the host processor 19 of the node C1 stores information indicating that the node A1 is transferring packets to the node B1 at the same time that the node E1 is transferring packets to the node F1. In other words, information indicating that the packet 22 is being substantially transferred from more than one node is stored in the host processor 19 of the node C1.

Figure 8:
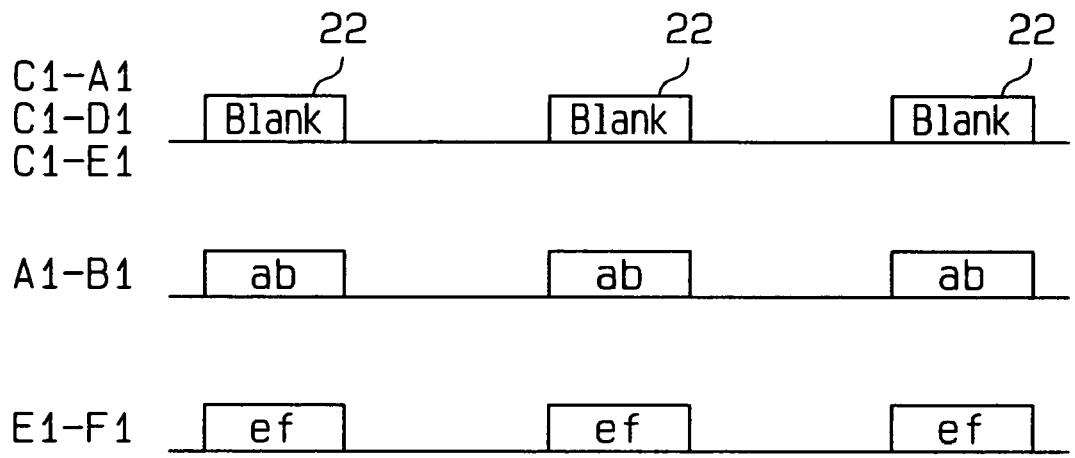
FIG. 8 is a first timing chart showing the transfer process performed by a first embodiment of the present invention.

The operation of the packet transfer control circuit 11 will now be discussed by describing the transfer of packets between the nodes A1–G1 of FIG. 1. FIG. 8 shows packets that are transferred between the nodes C1–A1, C1–D1, C1–E1, A1–B1, and E1–F1.

An example of when the node A1 transfers data to the node B1 while the node E1 transfers data to the node F1 will be described. Packet "ab" represents the write packet 22 that contains the data to be transferred from the node A1 to the node B1. Packet "ef" represents the write packet 22 that contains the data to be transferred from the node E1 to the node F1.

First, the node C1 transfers the write packet 22, the data portion 27 of which is blank, to the nodes A1, D1, E1 through the bus cables 1.

The node A1 determines that the data portion 27 of the write packet 22 is blank. Thus, the node A1 stores the data to be transferred in the data portion 27 of the write packet 22 and generates the packet ab, which is then transferred to the node B1.

In the same manner, the node E1 determines that the data portion 27 of the write packet 22 is blank and stores transfer data in the data portion 27 of the write packet 22 and generates the packet ef, which is then transferred to the node F1.

The node B1 then determines that the packet ab is addressed to it and processes the data stored in the packet ab.

The node G1 determines that the packet ef is not addressed to it and transfers the packet ef to the node F1.

The node F1 determines that the packet ef is addressed to it and processes the data stored in the packet ef.

Thus, the write packet 22 is sequentially transferred from the node C1. The packet ab is sequentially transferred between the nodes A1–B1, and the packet ef is sequentially transferred between the nodes E1–F1. In this manner, two different packets ab, ef are transferred simultaneously.

Figure 9:
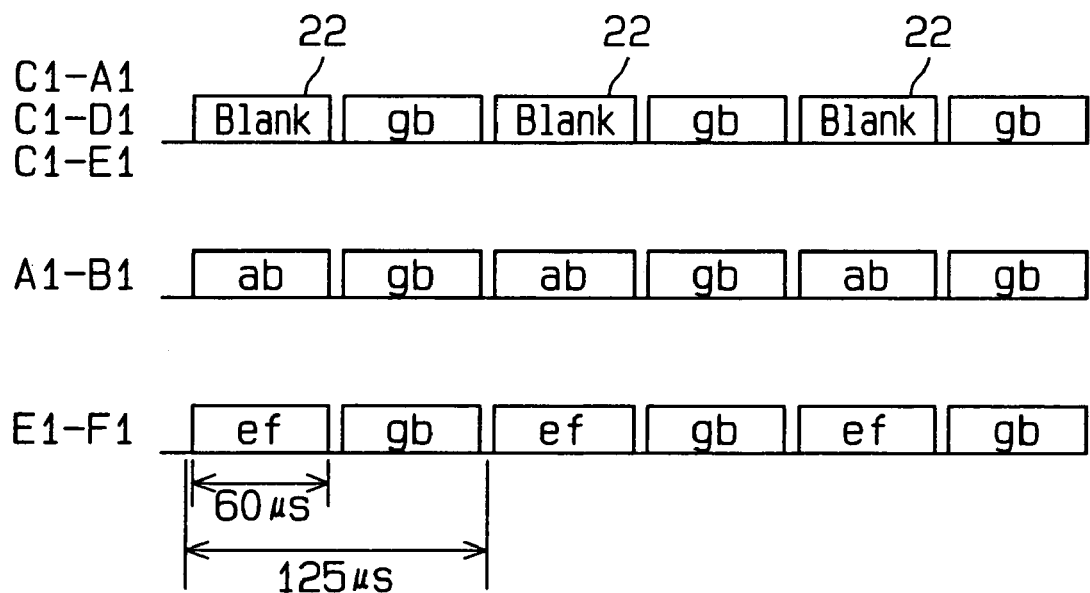
FIG. 9 is a second timing chart showing the transfer process performed by the first embodiment of the present invention.

With reference to FIG. 9, in a modified example of the first embodiment, the node A1 transfers the packet ab to the node B1, the node E1 transfers the packet ef to the node F1, and the node G1 transfers a packet gb to the node B1 during the same period of time (125 μs). The time required for packet transfer between each set of the nodes A1–B1, E1–F1, G1–B1 is 60 μs. In this case, as shown in FIG. 9, the packet ab transferred between the nodes A1 and B1 and the packet ef transferred between the nodes E1 and F1 are either multiplexed or transferred by different cables 1. As a result, all of the packets ab, ef, gb are transferred within 125 μs. (About 5 μs are required for switching, etc.) By multiplexing the packet transfer path, the amount of data transferred within a predetermined time and the bus transfer capacity are both increased.

The advantage of the packet transfer control circuit 11 will now be described.

(1) The node C1 transfers the blank write packets 22. The node A1 located between the node C1 and the downstream node B1 stores the data addressed to the node B1 in the blank write packet 22 to generate the packet ab, which is transferred to the node B1. The node E1 located between the node C1 and the downstream node F1 stores the data addressed to the node F1 in the blank write packet 22 to generate the packet ef, which is transferred to the node F1. Accordingly, the write packets 22 transferred to the downstream nodes B1, D1, F1 enable simultaneous transfer of the packets ab, ef, which contain different transfer data. Since different packets are transferred simultaneously, the data transfer efficiency is improved and the substantial transfer speed increases.

(2) The node C1 arranged upstream of the nodes A1 and E1 transfers the blank write packets 22. Thus, when the write packets 22 are transferred to the nodes B1, F1, the nodes A1, E1 store different transfer data in the write packet 22. This facilitates multiplex transfer.

(3) Based on the information that the node A1 transfers data to the node B1 when the node C1 transfers data, the node C1 simultaneously transfers the write packet 22. Thus, different data is written to the data portion 27 of the write packets 22, each of which is transferred in different directions at the same time. This ensures multiplex transfer. Further, the nodes A1, E1 easily perform multiplex transfer at an optimal timing.

(4) Identification information indicating that the data portion 27 is blank is written to the identifier 29. Further, when data is written to the data portion 27, identification information indicating the addressee of the data is written to the identifier 29. Accordingly, the node that receives the write packet 22 quickly determines whether or not data can be written to the data portion 27 of the packet 22 based on the identification information.

(5) When the amount of transfer data is small in comparison to the capacity of the data portion 27, the host processor 19 performs a padding process on the transfer data so that the amount of transfer data is maintained at a constant value. Accordingly, the length of the packets ab and ef, and the transfer time of the packets ab and ef are substantially the same. Thus, the transfer timing remains constant and data transfer is stabilized.

(6) The first embodiment may be applied to isochronous transfer in which data is simultaneously and continuously transferred within a limited time of 125 μs. That is, referring to FIG. 9, even if 60 μs is required to transfer packets from the nodes A1 to B1, E1 to F1, G1 to B1, all of the data is transferred normally by performing multiplex transfer of the packets ab, ef at the same time. This enables isochronous transfer to be performed without using expensive bus cables that have a high transfer capacity.

A second embodiment according to the present invention will be now be described with reference to FIGS. 3, 5, 6, 7, and 10.

The topology of the second embodiment is the same as the second prior art example of FIG. 3. Further, the structure of the packet transfer control circuit 11 employed in the second embodiment is the same as that of the first embodiment (FIG. 5) and will thus not be described again.

In the second embodiment, data is transferred from a certain node (A2) to a plurality of nodes (B2–G2). The transferrer of the write packet 22 is set to transfer data addressed to a plurality of nodes (PCb–PCg). The certain node transfers a blank write packet 22 to the plurality of nodes. Data is processed by a node undergoing data transfer and sent to the downstream nodes (B2–G2).

Figure 10:
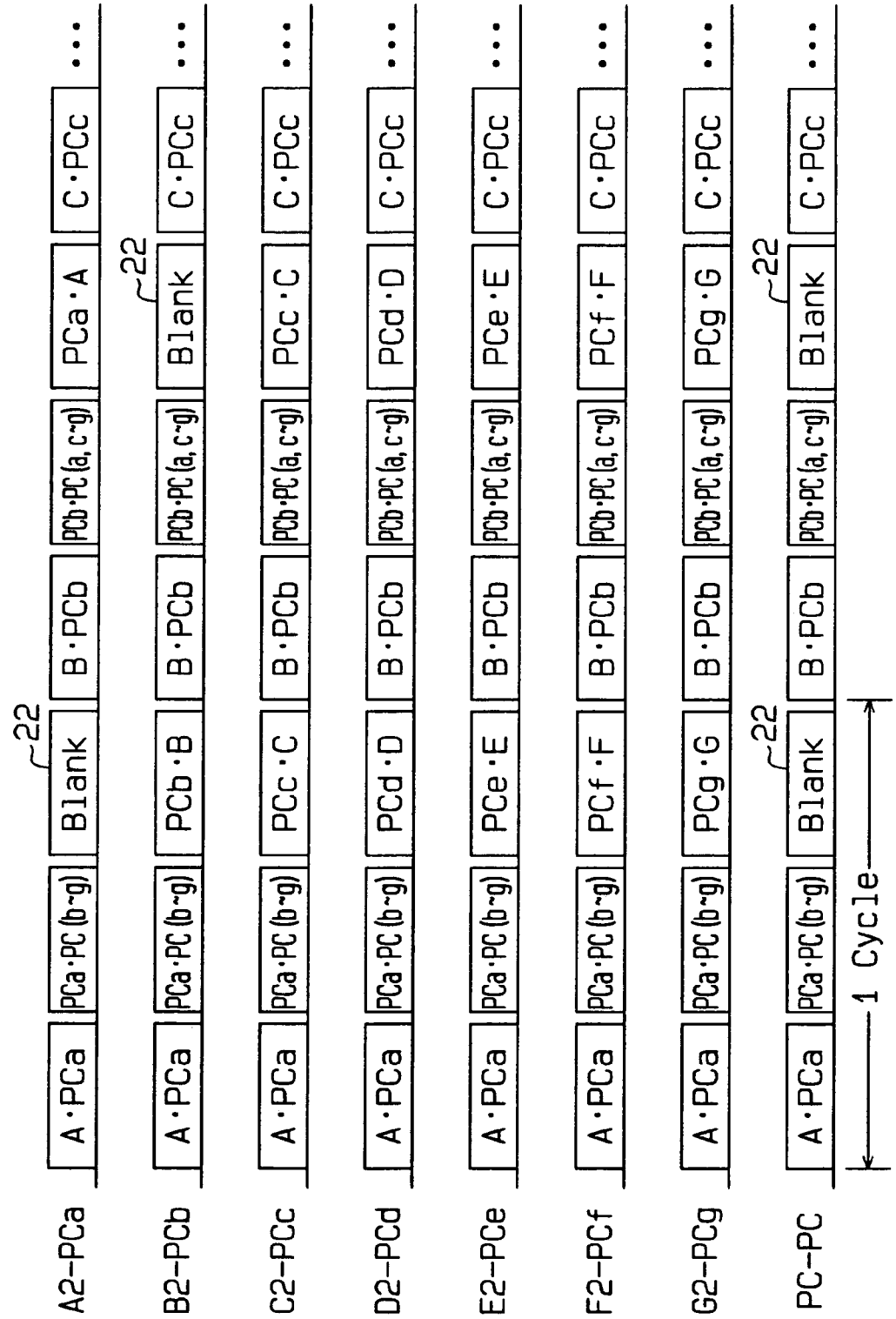
FIG. 10 is a first timing chart showing the transfer process performed by a second embodiment of the present invention.

FIG. 10 shows packets transferred between the nodes A2–PCa, B2–PCb, C2–PCc, D2–PCd, E2–PCe, F2–PCf, G2–PCg, and between the nodes PCa–PCg. Data transfer will now be described with reference to FIG. 10.

The node A2 transfers data to the node PCa, the node PCa then transfers processed data to each of the nodes PCb–PCg, and the nodes PCb–PCg each transfer the processed data to the associated nodes B2–G2. After the nodes B2–G2 receive the data, the nodes B2–G2 send response data back toward the downstream nodes A2–G2. The normal packet 21 containing the data transferred from the node A2 to the node PCa is referred to as packet A·PCa, and the normal packet 21 storing the data transferred from the node PCa to each of the nodes PCb–PCg is referred to as packet PCa·PC(b–g). Further, the write packets 22 containing data transferred from the nodes PCb–PCg to the associated nodes B2–G2 are each referred to as packets PCb·B, PCc·C, PCd·D, PCe·E, PCf·F, and PCg·G. In the second embodiment, the sever 2 receives and transmits the packets 21, 22 without processing the packets 21, 22.

More specifically, the packet A·PCa addressed to the node PCa is first transferred from the node A2. The packet A·PCa is then transferred to each of the nodes B2–G2 via the node PCa and the nodes PCb–PCg.

The node PCa determines that the packet A·PCa is addressed to it and processes the data stored in the packet A·PCa to generate processed data and the packet PCa·PC (b–g).

The node PCa transfers the packet PCa·PC(b–g) to the nodes PCb–PCg. The packet PCa·PC(b–g) contains the data processed by the node PCa. The packet PCa·PC(b–g) is transferred from the nodes PCb–PCg to the nodes B2–G2 and to the node A2. The nodes PCb–PCg each determine that the packet PCa·PC(b–g) is addressed to it and processes the data contained in the packet PCa·PC(b–g) to generate processed data.

The node PCa then transfers the blank write packet 22 to the nodes A2 and PCb–PCg.

The node PCb determines that the data portion 27 of the write packet 22 is blank. Thus, the node PCb generates the packet PCb·B, which contains the transfer data in the data portion 27 of the write packet 22, and transfers the packet PCb·B to the node B2.

In the same manner, each of the nodes PCc–PCg determines that the data portion 27 of the write packet 22 is blank. The nodes PCc–PCg each store the data transferred to the nodes C2–G2 in the data portion 27 of the write packet 22 and respectively generate the packets PCc·C, PCd·D, PCe·E, PCf·F, and PCg·G. The nodes PCc·PCg then transfer the packets PCc·C, PCd·D, PCe·E, PCf·F, PCg·G to the nodes C2–G2, respectively.

The node B2 determines that the packet B·PCb is addressed to it and processes the data stored in the packet PCb·B to generate processed data.

In the same manner, each of the nodes C2–G2 determines that the corresponding packet PCc·C, PCd·D, PCe·E, PCf·F, PCg·G is addressed to it and performs processes in accordance with the stored data.

In response to the received data, the node B2 transfers a data packet B·PCb to the node PCb. The node PCb then transfers a packet PCb·PC(a, c–g) and subsequently a blank write packet 22 to each of the nodes PCa, PCc–PCg. Each of the nodes PCa, PCc–PCg writes data in the data portion 27 of the corresponding write packet 22 and respectively generate packets PCa·A, PCa·C, PCa·D, PCa·E, PCa·F, PCa·G. The nodes PCa, PCc–PCg transfer the packets PCa·A, PCa·C, PCa·D, PCa·E, PCa·F, PCa·G to the nodes A2, C2–G2, respectively.

Subsequently, each of the nodes C2–G2 transfer data to other nodes A2–G2 using the blank write packets 22.

The packet transfer control circuit 11 of the second embodiment has the advantages described below.

(1) The node PCa transfers the blank write packets 22. The nodes PCb–PCg store the data addressed to the nodes B2–G2 in the write packets 22 and transfer the packets 22 as the packets PCb·B, PCc·C, PCd·D, PCe·E, PCf·F, and PCg·G. Accordingly, the employment of the write packets allows for simultaneous transfer of the packets PCb·B, PCc·C, PCd·D, PCe·E, PCf·F, PCg·G, which store different data. In the second prior art example, eight packet transfers were performed in a single data transfer cycle, as shown in FIG. 4. In the second embodiment, three packet transfers were performed in a single data transfer cycle, as shown in FIG. 10. As a result, the data transfer efficiency and the transfer speed are improved.

(2) The node PCa knows beforehand that it is the node that will transfer the packet PCa·PC(b–g) to the nodes PCb–PCg. After transferring the packet PCa·PC(b–g), the node PCa transfers the blank write packet 22. Since each of the nodes PCb–PCg store different data in the write packets 22, the nodes B2–G2 perform multiplex transfer at the same time.

The first and second embodiments may be modified as described below.

Figure 11:
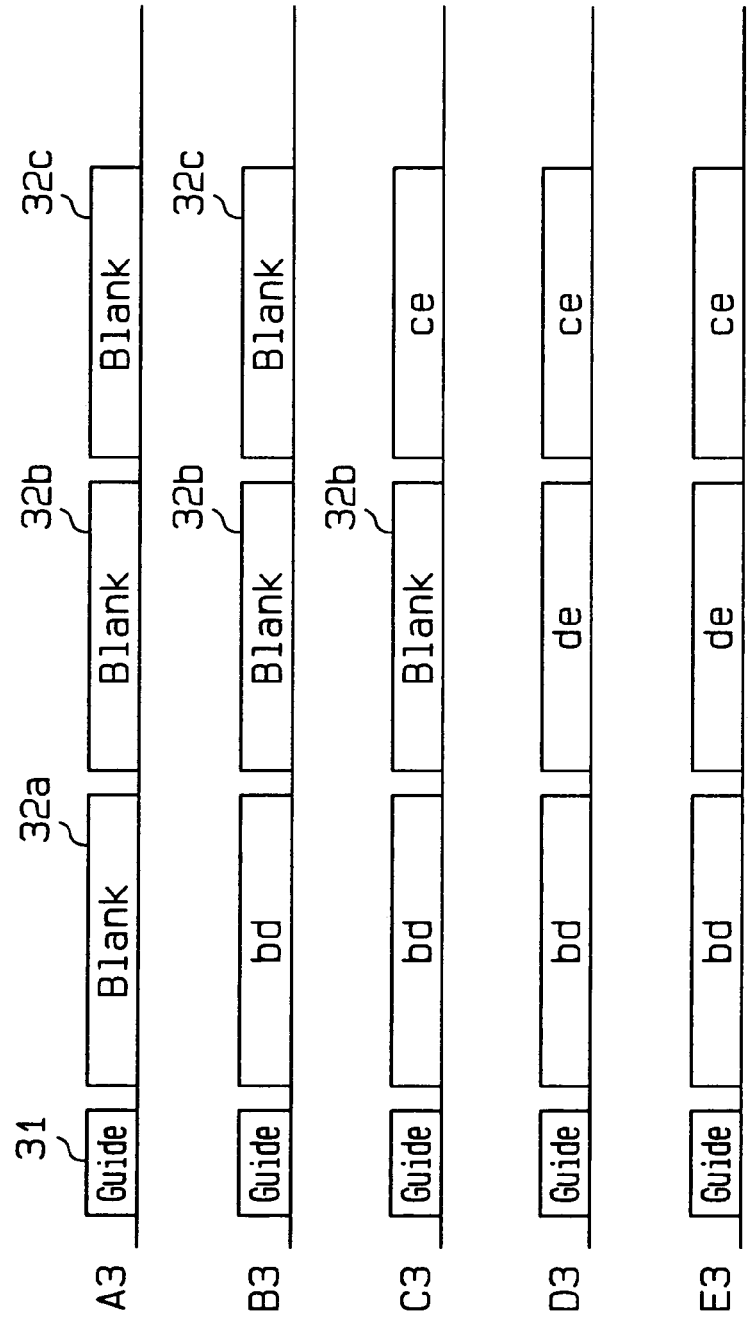
FIG. 11A is a timing chart showing the transfer process performed by an example according to the present invention.
FIG. 11B is a schematic diagram showing a network topology.

(a) As shown in FIG. 11A, the identifier 29 may be used as a guide packet 31 separated from the write packet 22. In this case, the guide packet 31 and a plurality (three in FIG. 11A) of write packets 32a, 32b, 32c are transferred. The guide packet 31 stores guide information such as the number of the subsequent write packets and the state of each of the write packets 32a, 32b, 32c.

An example of a system (FIG. 11B) in which the nodes A3–E3 are connected in series by bus cables will be described. Referring to FIG. 11A, the node A3 first transfers the guide packet 31 and then successively transfers the three blank packets 32a–32c. The guide packet 31 contains information indicating that the blank packets 32a–32c will be subsequently transferred.

When the node B3 receives the guide packet 31, the node B3 writes information to the guide packet 31 indicating that the data transferred to the node D3 is to be written to the first packet 32a based on the guide information. The guide packet 31 is transferred to the node C3. The packet 32a denoted "bd" in FIG. 11B contains data transferred from the node B3 to the node D3.

When the node C3 receives the guide packet 31 from the node B3, the node C3 writes information to the guide packet 31 indicating that the data transferred to the node D3 is to be written to the third packet 32c based on the guide information. The guide packet 31 is transferred to the node D3. The packet 32c denoted "ce" in FIG. 11A contains data transferred from the node C3 to the node E3.

When the node D3 receives the guide packet 31 from the node C3, the node D3 writes information to the guide packet 31 indicating that the data transferred to the node E3 is to be written to the second packet 32c based on the guide information. The guide packet 31 is transferred to the node E3. The packet 32c denoted "de" in FIG. 11A contains data transferred from the node D3 to the node E3.

The node D3 determines that the first packet bd is addressed to it based on the guide information. The node E3 determines that the second and third packets de, ce are also addressed to it based on the guide information. The nodes A3–E3 then process the data based on the guide information.

In this example, the state of each packet 32a–32c is indicated beforehand by the guide packets 31. In a system connecting the node A3 to a plurality of nodes, including the node B3, multiplex data transfer may be performed by the node B3 and the other nodes at the same time. Accordingly, the data transfer efficiency is further improved. Further, multiplex data transfer is performed without using the normal packets 21.

(b) Instead of transferring a blank normal packet 21 or write packet 22 from a certain node (e.g., C1, PCa), the certain node may transfer a normal packet 21 or a write packet 22 containing data. In this case, the other nodes rewrite the data portions 24, 27 of the packets to perform multiplex transfer.

An example of such data transfer will be discussed based on the second embodiment.

In this example, when each of the nodes PCa–PCg receive a write packet 22 addressed to another upstream node, each node PCa–PCg rewrites the data stored in the data portion 27 with prestored data and sends the write packet 22 to a downstream node.

The nodes A2–G2 and PCa–PCg then repeat the data transfer of the second embodiment. That is, after a first cycle of the data transfer from the node G2 to the nodes A2–F2 is completed, a second cycle of the data transfer from the node A2 is performed.

Referring to FIG. 12, the packet A·PCa of the first cycle is referred to as a1(1), and the packet A·PCa of the second cycle is referred to as a1(2). The packet PCa·Pc(b–g) of the first cycle is referred to as a2(1), and the packet PCa·Pc(b–g) of the second cycle is referred to as a2(2). The packets PCb·B, PCc·C, PCc·C, PCd·D, PCe·E, PCf·F, PCg·G of the first cycle are grouped together and referred to as a3(3). The packet B·PCb of the first cycle is referred to as b1(1).

After the packet a2(1) is transferred in the first cycle, the packet b1(1) is transferred. In this state, each of the nodes PCb–PCg that receive the packet a2(1) processes the data contained in the packet a2(1) and temporarily stores the processed data.

Then, after the packet g2(1) is transferred in the first cycle, the second transfer cycle of the packet a1(2) is performed. In this state, the packet a1(2) is received by the node PCa. The packet a1(2) is then transferred to the nodes PCb–PCg from the node PCa. The nodes PCb–PCg rewrite the data of the data portion 27 with the stored data and transfer the packet a3(1) to each of the nodes B2–G2.

Afterward, the data of the packets b1(2)–g1(2) are rewritten by the nodes PCa–PCg and transferred to the nodes A2–G2 as the packets b3(1)–g3(1).

In this manner, when the packet a1(2) of the second cycle is received by the upstream node PCa, the downstream nodes PCb–PCg rewrite the packet a1(2) with the data of the first cycle. Since two transfers are completed in one cycle, the data transfer efficiency is further improved. In this case, the packet a3(1) is transferred more slowly than the second embodiment. However, for example, when image data is stored in the packet a3(1) and the image data is displayed on a display device with a delay of a few microseconds, a user would not discern the delay.

(c) In each of the above embodiments, blank write packets 22 are transferred from certain nodes at certain times. However, the write packets 22 may be transferred by any node at any time. In this case, multiplex transfer may be performed as long as the transfer timing of the blank write packets 22 matches the write data timing of the node.

For example, in the structure of the first embodiment (FIG. 1), the node C1 transfers the blank write packets 22 every predetermined cycle. In this case, each of the nodes A1–G1 is notified that the write packet 22 will be transferred every predetermined cycle. The nodes A1, E1, G1 store transfer data in the data portion 27 of the write packet 22 in correspondence with the transfer timing of the write packets 22. In this state, for example, if the transfer timing of the write packet 22, the timing when the node A1 transfers data to the node E1, and the timing when the node E1 transfers data to the node F1 matches, multiplex transfer of data is performed.

When the nodes A1, E1, G1 receive the write packet 22, each of the nodes A1, E1, G1 may hold the transfer data for a predetermined time and store the data in the write packet 22. By holding data in this manner, the adjustment of the transfer timing of the blank write packet 22 relative to the data write timing of the node is facilitated. This enables multiplex transfer of data to be performed accurately.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A method comprising:
   transferring a write packet from a first node to a second node, when a plurality of nodes, including the first node, the second node and a third node, connect by a bus but not connected in a ring form and the plurality of nodes constitute an IEEE 1394 topology, the write packet having an identifier storing identification information which indicates addressee of data stored in data portion of the write packet or indicates that the data portion of the write packet includes a blank data portion;
   determining at a link layer processor of the second node whether a received packet is the write packet;
   checking at an identification circuit of the second node the identification information of the identifier of the received write packet and determining whether data stored in the data portion of the write packet can be replaced with another data stored in the second node and to be addressed to the third node;
   storing data addressed to the third node and to be written in a data portion of a packet, in the data portion of the write packet at the second node in accordance with the checking result, wherein said storing data includes replacing the data stored in the data portion of the write packet with said another data; and
   transferring the write packet from the second node to the third node.

2. The packet transfer method according to claim 1, wherein the write packet comprises a blank data portion for storing the data.

3. The packet transfer method according to claim 1, wherein the first node has information indicating that a plurality of the second nodes substantially simultaneously transfer packets to a plurality of the third nodes, and the write packet transferring comprises transferring a plurality of write packets to the plurality of the second nodes based on the information.

4. The packet transfer method according to claim 1, wherein the write packet includes a header portion and a data portion, and the identification information is arranged in the data portion of the write packet.

5. The packet transfer method according to claim 1, further comprising:
   transferring a data packet from the first node to the second node;
   processing the data stored in the data packet at the second node; and
   transferring the data packet including the processed data to the third node, wherein the write packet transferring is performed after the data packet transferring.

6. The packet transfer method according to claim 1, wherein the write packet transferring comprises transferring the write packet from the first node to the second node at predetermined time periods.

7. The packet transfer method according to claim 1, further comprising padding the data stored in the write packet so that the data amount is substantially same as the data storage capacity of the write packet.

8. The packet transfer method according to claim 1, wherein the data comprises image data.

9. A method of transferring packets between a plurality of nodes including a first node, a second node, and a third node connected by a bus but not connected in a ring form, the method comprising:
   transferring a write packet from the first node to the second node;
   storing data to be written in a data portion of a packet addressed to the third node in the data portion of the write packet at the second node; and
   transferring the write packet from the second node to the third node,
      wherein the write packet transferring comprises transferring from the first node to the second node a guide packet that stores guide information indicating a state of the write packet, before the first node transfers the write packet to the second node, and
      wherein the data storing by the second node comprises writing as the guide information of the guide packet information indicating that the data has been written to the write packet by the second node.

10. A method of transferring packets between a plurality of connected nodes including a first node, a second node, and a third node, the first node, the second node, and the third node not connected in a ring form, the method comprising:
   transferring a first packet storing first data from the first node to the second node;
   processing the first data stored in the first packet and temporarily storing the processed first data at the second node;
   transferring a second packet storing second data from the first node to the second node;
   rewriting the second data stored in the second packet with the processed and temporarily stored first data at the second node; and
   transferring the second packet including the processed first data to the third node.

11. A packet transfer control circuit, comprising:
   a link layer processor as a first node to determine whether a received packet is a write packet, when a plurality of nodes, including the first node, a second node and a third node, are not connected in a ring form and the plurality of nodes constitute an IEEE 1394 topology, wherein the write packet has an identifier storing identification information which indicates addressee of data stored in data portion of the write packet or indicates that the data portion of the write packet includes a blank data portion;
   an identification circuit connected to the link layer processor to check the identifier of the write packet received from an upstream node and determine whether data stored in the data portion of the write packet can be replaced with another data stored in the packet transfer control circuit and to be addressed to a downstream node; and
   a host processor connected to the identification circuit to store data addressed to the downstream node to be written in a data portion of a packet, in the data portion of the received write packet in accordance with the checking result of the identification circuit, wherein said storing data includes replacing the data stored in the data portion of the received write packet with said another data, and transferring the write packet to the downstream node.

12. The packet transfer control circuit according to claim 11, wherein the host processor pads the data stored in the write packet until the data amount is substantially same as data storage capacity of the data portion of the write packet.

13. A packet transfer control circuit incorporated in a first node to transfer a packet to a plurality of other nodes where one of said plurality of other nodes is a downstream node from the first node and one of said plurality of nodes is an upstream node from the first node, in which the first node, and the plurality of other nodes are not connected in a ring form, and the first node and the plurality of other nodes, are among a plurality of nodes constituting an IEEE 1394 topology, the packet includes a data portion for storing data, the first node control circuit comprising:
   a processor to perform a multiplex transfer by processing data, which is addressed to the downstream node and stored in a data portion of a packet received from the upstream node, temporarily retaining the processed data addressed to the downstream node, and rewriting data stored in a data portion of a packet received from the upstream node with the temporarily retained processed data, if the data stored in the data portion of the packet received from the upstream node is addressed to the downstream node wherein the processor checks an identifier of a write packet received from the upstream node and determines whether data stored in data portion of the write packet can be replaced with the temporarily retaining processed data addressed to the downstream node and replaces the data stored in the data portion of the received write packet with the temporarily retaining processed data in accordance with the checking result.

14. A packet transfer control circuit, comprising:
a processor as first node transferring a plurality of packets determinable at a link layer processor as write packets, the data portion of which is blank, to each of second and third nodes, when a plurality of nodes, including the first, second and third nodes, are not connected in a ring form and the plurality of nodes constitute an IEEE 1394 topology, based upon information indicating that the second and third nodes substantially simultaneously store data in the data portion of the write packets received from the first node, wherein the processor checks an identifier of each write packet received from an upstream node and determines whether data stored in data portion of each write packet can be replaced with another data stored in the packet transfer control circuit and to be addressed to the second and third nodes and replaces the data stored in the data portion of each write packet with the another data in accordance with the checking result.

15. A packet transfer control circuit incorporated in a first node to transfer a plurality of packets to a second node and a third node, in which the first node, the second node, and the third node are not connected in a ring form and each packet includes a data portion for storing data, the control circuit comprising:
 a processor transferring a plurality of write packets, the data portion of which is blank, to each of the second and third nodes so that the second and third nodes substantially simultaneously store data in the data portion of the write packets received from the first node,
  wherein the processor transfers to the second and third nodes a plurality of guide packets that store guide information indicating a state of the write packets before transferring the write packets from the first node to the second and third nodes, and
  wherein the guide information written to the guide packets at the second and third nodes indicates that data has been written to the write packets by the second and third nodes, when the second and third nodes store the data in the data portion of the write packets received from the first node.

16. A packet transfer control circuit, comprising:
 a processor as a first node among a plurality of nodes, which include the first node and a plurality of second nodes, not connected in a ring form and constitute an IEEE 1394 topology, transfers to the plurality of second nodes a packet determinable as a write packet at a data link layer processor of the plurality of second nodes, the data portion of which stores data, and then transferring another write packet, the data portion of which is blank, wherein each second node stores data in the blank data portion of the write packet wherein the processor checks an identifier of the write packet received from an upstream node and determines whether data stored in data portion of the write packet can be replaced with another data stored in the packet transfer control circuit and to be addressed to the second nodes and replaces the data stored in the data portion of the write packet with the another data in accordance with the checking result.

17. A packet transfer control circuit incorporated in a first node to transfer packets to a plurality of second nodes, in which the first node and the plurality of second nodes are not connected in a ring form and each packet includes a data portion for storing data, the control circuit comprising:
 a processor transferring to each second node a write packet, the data portion of which stores data, and then another write packet, the data portion of which is blank, wherein each second node stores data in the blank data portion,
  wherein the processor transfers to the second nodes guide packets that store guide information indicating a state of each write packet before transferring each write packet from the first node to the second nodes, and
  wherein the guide information written to the guide packets at the second nodes indicates whether data has been written to each write packet by the second nodes, when each of the second nodes stores the data in the blank data portion of each write packet received from the first node.

18. A packet transfer control circuit of a first network node, comprising
 an input interface circuit for receiving a packet from a second network node connected to the first network node, the received packet being one of a normal packet type and a write packet type, and the received packet comprising at least a header portion and a data portion;
 an input link layer processing circuit, connected to the input interface circuit, for receiving the received packet therefrom, reading the header portion of the packet to determine the packet type, and if the received packet is a normal packet, also determining an addressee of the packet;
 an identification circuit, connected to the input link layer processing circuit, for receiving a write packet type of packet from the input link layer processing circuit, checking an identifier of the data portion of the write packet to determine whether the data portion of the write packet is blank and to determine an addressee of the write packet, wherein the identification circuit generates a control signal if the data portion is blank;
 a processor, connected to the identification circuit and the input link layer processing circuit, wherein the input link layer processing circuit passes the received packet directly to the processor if the received packet is addressed to the first node and is a normal type packet, wherein the processor receives the packet data from the identification circuit if the packet is a write type packet, and wherein the processor receives the control signal from the identification circuit and pads the data portion of the packet in order to fill the data portion of the packet when the control signal indicates that the data portion is blank;
 a memory, connected to the processor, for storing the packet data processed by the processor;
 an output link layer processing circuit, connected to the processor and to the input link layer processing circuit, for receiving the packet therefrom and preparing a transmission packet from the packet, wherein the input link layer processing circuit passes a normal type packet not addressed to the first node directly to the output link layer processing circuit; and
 an output interface circuit, connected to the output link layer processing circuit, for receiving the transmission packet therefrom and transmitting the transmission packet over a bus to another node.

19. The packet transfer control circuit of claim 18, wherein the packets are transferred between nodes over an IEEE 1394 compatible bus.

20. The packet transfer control circuit of claim 18, further comprising:
 an input physical layer processing circuit, connected between the input link layer processing circuit and the input interface circuit, for receiving the packets from the input interface circuit and transferring them to the input link layer processing circuit.

21. The packet transfer control circuit of claim 20, further comprising:
 an output physical layer processing circuit connected between the output link layer processing circuit and the output interface circuit, for transferring the transmission packet from the output link layer processing circuit to the output interface circuit.

22. A method, comprising:
 transferring a write packet from a first node to a second node, when a plurality of nodes, including the first node, the second node and a third node, are connected in a star form and the plurality of nodes constitute an IEEE 1394 topology, the write packet having an identifier storing identification information which indicates addressee of data stored in data portion of the write packet or indicates that the data portion of the write packet includes a blank data portion;

determining at a link layer processor of the second node whether a received packet is the write packet;

checking at an identification circuit of the second node the identification information of the identifier of the received write packet and determining whether data stored in the data portion of the write packet can be replaced with another data stored in the second node and to be addressed to the third node;

storing data addressed to the third node and to be written in a data portion of a packet, in the data portion of the write packet at the second node in accordance with the checking result, wherein said storing data includes replacing the data stored in the data portion of the write packet with said another data; and transferring the write packet from the second node to the third node.

23. The packet transfer method according to claim 22, wherein the data comprises image data.

24. A packet transfer control device, comprising:

a link layer processor as a first node to determine whether a received packet is a write packet, when a plurality of nodes, including the first node, a second node and a third node, are connected in a star form and the plurality of nodes constitute an IEEE 1394 topology wherein the write packet has an identifier storing identification information which indicates addressee of data stored in data portion of the write packet or indicates that the data portion of the write packet includes a blank data portion;

an identification circuit connected to the link layer processor to check the identifier of the received write packet and determine whether data stored in the data portion of the write packet can be replaced with another data stored in the packet transfer control device and to be addressed to a downstream node; and a host processor connected to the identification circuit to store data addressed to the downstream node to be written in a data portion of a packet, in the data portion of the received write packet in accordance with the checking result of the identification circuit, wherein said storing includes replacing the data stored in the data portion of the received write packet with said another data, and transferring the write packet to the downstream node.

* * * * *

UNITED STATES PATENT AND TRADEMARK OFFICE
CERTIFICATE OF CORRECTION

| | |
|---|---|
| PATENT NO. | : 7,233,592 B1 |
| APPLICATION NO. | : 09/505775 |
| DATED | : June 19, 2007 |
| INVENTOR(S) | : Kenji Oi et al. |

Page 1 of 1

It is certified that error appears in the above-identified patent and that said Letters Patent is hereby corrected as shown below:

Column 12, Line 62, after "transfer" insert --write--.

Column 14, Line 30, change "nodes," to --nodes--.

Column 15, Line 67, change "comprising" to --comprising:--.

Signed and Sealed this

Eighth Day of April, 2008

JON W. DUDAS
*Director of the United States Patent and Trademark Office*